(12) United States Patent
Choquette

(10) Patent No.: US 8,505,952 B1
(45) Date of Patent: Aug. 13, 2013

(54) LIGHT-WEIGHT TOW BAR FOR VEHICLES AND LEG LOCK THEREFOR

(75) Inventor: Paul Choquette, Lincoln, NE (US)

(73) Assignee: Automatic Equipment Mfg. Co., Pender, NE (US)

( * ) Notice: Subject to any disclaimer, the term of this patent is extended or adjusted under 35 U.S.C. 154(b) by 254 days.

(21) Appl. No.: 13/136,773

(22) Filed: Aug. 10, 2011

(51) Int. Cl.
*B60D 1/54* (2006.01)

(52) U.S. Cl.
CPC ........................................ *B60D 1/54* (2013.01)
USPC ........................................ 280/491.2; 280/494

(58) Field of Classification Search
USPC ............. 280/479.2, 479.3, 491.2, 491.1, 493, 280/494, 482, 491.4
See application file for complete search history.

(56) References Cited

U.S. PATENT DOCUMENTS

| | | | | |
|---|---|---|---|---|
| 1,610,902 A | * | 12/1926 | Tomlinson | 280/481 |
| 3,881,830 A | * | 5/1975 | Kato et al. | 403/171 |
| 4,128,353 A | * | 12/1978 | Lauterbach | 403/175 |
| 4,200,306 A | * | 4/1980 | Helms | 280/494 |
| 4,548,423 A | * | 10/1985 | Craven | 280/492 |
| 4,592,564 A | * | 6/1986 | Warnock et al. | 280/402 |
| 5,224,960 A | * | 7/1993 | Duncan | 280/491.4 |
| RE35,482 E | | 3/1997 | Johnson | |
| 5,647,604 A | * | 7/1997 | Russell | 280/492 |
| 5,762,167 A | * | 6/1998 | Hendrix | 188/112 R |
| 5,765,851 A | | 6/1998 | Parent | |
| 5,915,715 A | * | 6/1999 | Ford | 280/494 |
| 5,957,477 A | | 9/1999 | Ensz et al. | |
| 6,168,182 B1 | * | 1/2001 | Ford | 280/494 |
| 7,390,007 B2 | | 6/2008 | Helms et al. | |
| 7,461,855 B2 | * | 12/2008 | Klar | 280/478.1 |
| 7,837,216 B1 | * | 11/2010 | Greaves et al. | 280/491.4 |
| 7,942,435 B1 | | 5/2011 | Huston et al. | |
| 7,959,179 B1 | | 6/2011 | Merchant | |
| 7,959,180 B1 | | 6/2011 | Huston et al. | |
| 7,988,179 B1 | | 8/2011 | Goodman et al. | |
| 8,056,919 B1 | * | 11/2011 | Huston et al. | 280/493 |
| 8,066,299 B2 | * | 11/2011 | Olsen | 280/491.2 |
| 2006/0249926 A1 | * | 11/2006 | Smith | 280/491.1 |

* cited by examiner

*Primary Examiner* — Paul N Dickson
*Assistant Examiner* — Wesley Potter
(74) *Attorney, Agent, or Firm* — Donald R. Schoonover

(57) ABSTRACT

A tow bar including a towing hitch member connected to a towing vehicle; a towed hitch member connected to a vehicle to be towed; a head member having a front connector connected to the towing hitch member, and an articulated portion; leg connectors pivotally connected to the articulated portion; tow bar legs having outer and inner members constructed of composite material; locking members with biased cam elements and stop elements; rear connectors for connecting the tow bar legs to the towed hitch member; storage latches for releasably securing the tow bar legs in a stored configuration; protective boots for exposed portions of the inner members; and epoxy for securing the outer members to the leg connectors and the locking members, and the inner members to the stop elements and the rear connectors.

20 Claims, 3 Drawing Sheets

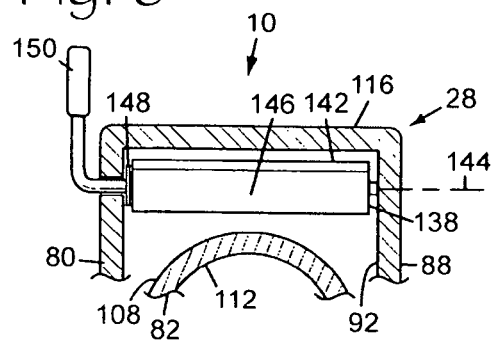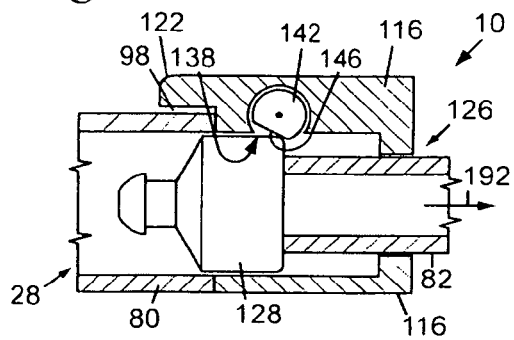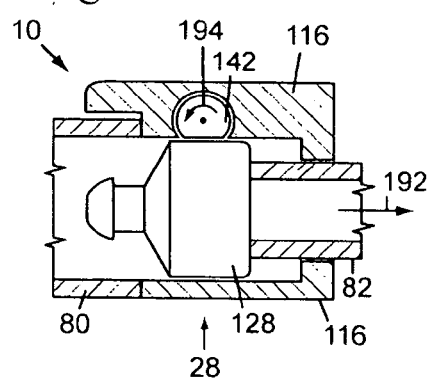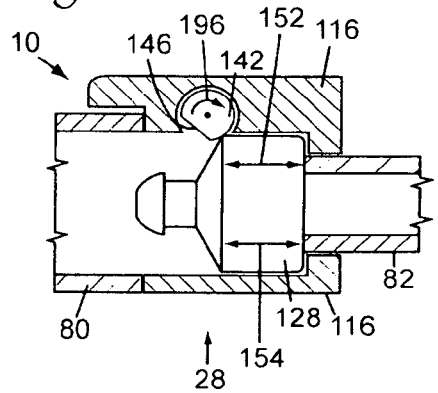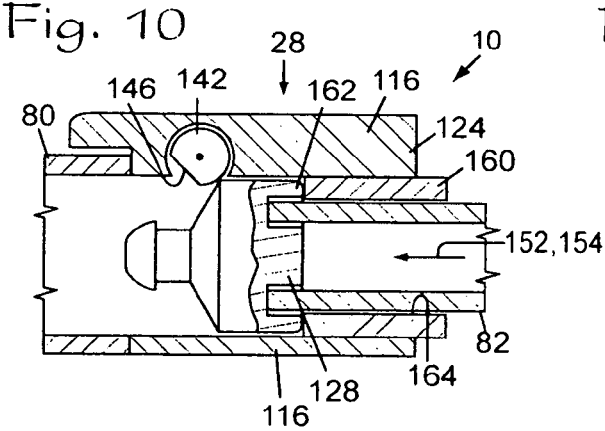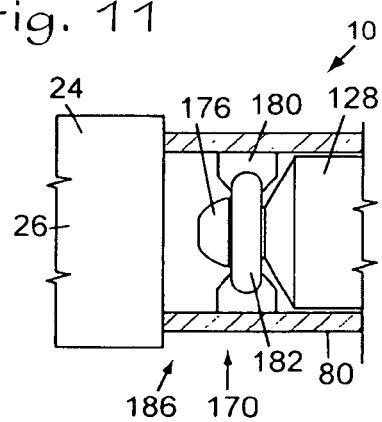

LIGHT-WEIGHT TOW BAR FOR VEHICLES AND LEG LOCK THEREFOR

BACKGROUND OF THE INVENTION

1. Field of the Invention

The present invention relates to towing accessories and, more particularly without limitation, to tow bars for connecting a towing vehicle to a vehicle to be towed.

2. Description of the Related Art

A tow bar is generally used for connecting a towing vehicle to a vehicle to be towed, the latter sometimes being referred to herein as a towed vehicle. For applications wherein the towed vehicle will be towed at a speed sufficient to move with the flow of traffic on a public roadway, the tow bar, which connects the front end of the towed vehicle to the rear end of the towing vehicle, generally has two tow bar legs with the front ends of the tow bar legs forming the apex of an isosceles triangle and the rear ends of the tow bar legs being spaced apart to form the sides of the triangle. The triangular configuration causes the towed vehicle to closely track the towing vehicle along straightaways and around corners.

For tow bar applications, such as where heavy, massive equipment will be moved a relatively short distance, such as where an airliner is to be backed away from a terminal for example, the tow bar generally has only one tow bar leg. For such applications, one end of the tow bar leg may be connected to the front end of the vehicle to be moved and the other end of the tow bar leg being connected to the front end of the towing vehicle so the operator of the towing vehicle can face the towed vehicle and can carefully observe the response of the towed vehicle as it is being slowly moved by the towing vehicle.

Most tow bars must be designed to accommodate variations in attitude that inherently exist between towing and towed vehicles, which variations are constantly and continuously changing. One such variation in attitude between the vehicles is the instantaneous sidewise tilt of the towing vehicle relative to the instantaneous sidewise tilt of the towed vehicle, such as the rocking motion which occurs when traversing uneven or rough pavement for example. This phenomenon, sometimes referred to as "roll", can be accommodated by tow bar apparatus designed to accommodate rotations between the towing and towed vehicles about a fore-to-aft horizontal axis, see the "x"-axis in FIG. 1.

Another such variation in attitude between the vehicles is the instantaneous horizontal direction in which the towing vehicle is traveling relative to the instantaneous horizontal direction in which the towed vehicle is traveling, such as when the towed vehicle is being pulled around an unbanked corner for example. This phenomenon, sometimes referred to as "yaw", can be accommodated by apparatus designed to accommodate rotations between the towing and towed vehicles about a vertical axis, see the "y"-axis in FIG. 1.

Finally, another such variation in attitude between the vehicles is the instantaneous elevation of the towing vehicle relative to the instantaneous elevation of the towed vehicle. A related variation in attitude between the vehicles is the instantaneous ascent/descent orientation of the towing vehicle relative to the instantaneous ascent/descent orientation of the towed vehicle. Both of these related variations in attitude can be accommodated by apparatus designed to accommodate rotations between the towing and towed vehicles about a transverse, horizontal axis, sometimes referred to as the "pitch" axis, see the "z"-axis in FIG. 1.

During actual towing operations, all combinations of roll, yaw and pitch are continuously occurring and changing. Prior art is replete with tow bar designs that have been developed in an attempt to accommodate these phenomena, some of those designs being more successful than others. For example, a hitch ball/hitch ball-receiver combination securing a tow bar to a towing vehicle can theoretically accommodate all three of the roll, yaw and pitch phenomena. Although the ability of such a combination to accommodate yaw is encouraging, unfortunately the ability of such a combination to accommodate either roll or pitch is extremely limited where failure to closely abide by such limitations can produce disastrous and even fatal results.

A commonly used arrangement involves using a conventional receiver hitch in combination with a square hitch shank. Although such an arrangement may be convenient for connecting a tow bar to a towing vehicle, this type of connection by itself provides absolutely no ability to accommodate any one of the three roll, yaw or pitch phenomena. As a result, the tow bar itself and/or the connections between the tow bar and the towed vehicle must be relied upon to provide a solution for minimizing the potentially dangerous aspects arising from these three phenomena.

Typically, a tow bar is first connected to a towing vehicle followed by connecting the tow bar to the towed vehicle. It is difficult, if not impossible, to perfectly align a towing vehicle with, and perfectly space the towing vehicle from, the towed vehicle so the tow bar legs can be easily and conveniently connected to the towed vehicle. Many towing hitch arrangements of towed vehicles require precise fore-to-aft, horizontal, and/or angular alignment of tow bar leg connectors with mating connectors of a towed hitch arrangement so pivot pins can be inserted through orifices of those mating connectors while the mating parts of the tow bar are physically held in place relative to those of the towed vehicle. Such activity can be extremely stressful, sometimes requiring the efforts of more than one person. Therefore, an ability to manually apply roll, yaw and pitch rotations could be very useful while connecting a tow bar to a hitching arrangement of a towed vehicle.

Such stress and effort could be further reduced if a tow bar could be constructed of light-weight, high-strength material. Such materials have been developed but most are either too expensive for use in tow bar construction, or are frangible and cannot reliably endure the adverse environment to which tow bars are normally subjected, particularly when the frangible material must be penetrated in order to assemble the various components of a tow bar. Such penetrations would severely degrade the structural integrity of many apparatii, particularly tow bars, constructed from such material.

What is needed is a tow bar constructed of light-weight, high-strength materials which one person working alone can easily lift and use to connect a towing vehicle to a towed vehicle.

What is also needed is a tow bar constructed of light-weight, high-strength materials, including frangible material, which one person working alone can easily lift and use to connect a towing vehicle to a towed vehicle.

What is further needed is a tow bar constructed of light-weight, high-strength materials, including frangible material, which can be assembled without penetrating the frangible material.

What is still further needed is a locking member for a tow bar constructed of light-weight, high-strength materials, including frangible material, wherein the locking member does not require penetration of the frangible material.

SUMMARY OF THE INVENTION

The improvements of the present invention for a tow bar for connecting a towing vehicle to a vehicle to be towed include a towing hitch member connected to a towing vehicle; a towed hitch member connected to a vehicle to be towed; a head member having a front connector structured to connect the head member to the towing hitch member, and an articulated portion; leg connectors pivotally connected to the articulated portion; tow bar legs having outer and inner members constructed of composite material; a locking member having a body element with a distal end or insert, a biased cam element and a stop element; rear connectors structured for releasably connecting to the towed hitch member; storage latches structured to releasable secure the tow bar legs in a stored configuration; and securing means to secure the outer members to the leg connectors and the fore ends of the locking members, and to secure the inner members to the stop elements and the rear connectors.

The cam element is spaced from the distal end or insert of the body element wherein, as the inner member is being displaced rearwardly relative to the outer member and the aft end of the stop element abuttingly engages the aft end or insert of the body element, the fore end of the stop element simultaneously clears the cam element whereupon the cam element is automatically biased into the path of the stop element locking the inner member relative to the outer member.

PRINCIPAL OBJECTS AND ADVANTAGES OF THE INVENTION

The principal objects and advantages of the present invention include: providing a tow bar constructed of light-weight, high-strength materials which one person working alone can easily lift and use to connect a towing vehicle to a towed vehicle; providing such a tow bar constructed of light-weight, high-strength materials, including frangible material, which one person working alone can easily lift and use to connect a towing vehicle to a towed vehicle; providing such a tow bar constructed of light-weight, high-strength materials, including frangible material, which can be assembled without penetrating the frangible material; providing a locking member for such a tow bar constructed of light-weight, high-strength materials, including frangible material, wherein locking members thereof do not require penetration of the frangible material; and generally providing such a tow bar that is easily constructed, reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWING FIGURES

FIG. 6 is a still further enlarged, fragmentary and partially cross-sectional view taken along line 6-6 of FIG. 5 of the tow bar.

FIG. 7 is a partially cross-sectional and schematic representation of a stop element being displaced toward a contoured surface of a cam element of a tow bar leg of the tow bar.

FIG. 8 is a view similar to FIG. 7 but showing the cam element pivoted out of a path of the stop element of the tow bar leg of the tow bar.

FIG. 9 is a view similar to FIGS. 7 and 8 but showing the cam element and contoured surface pivoted back into the path of the stop element of the tow bar leg of the tow bar and locking an inner member of the tow bar leg relative to an outer member of the tow bar leg.

FIG. 10 is an enlarged and partially cross-sectional view of an alternative insert secured to an aft end of a body element of the locking member of a tow bar leg of the tow bar.

FIG. 11 is a partially cross-sectional and schematic representation of a storage latch and showing a tow bar leg of the tow bar in a stored configuration, according to the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
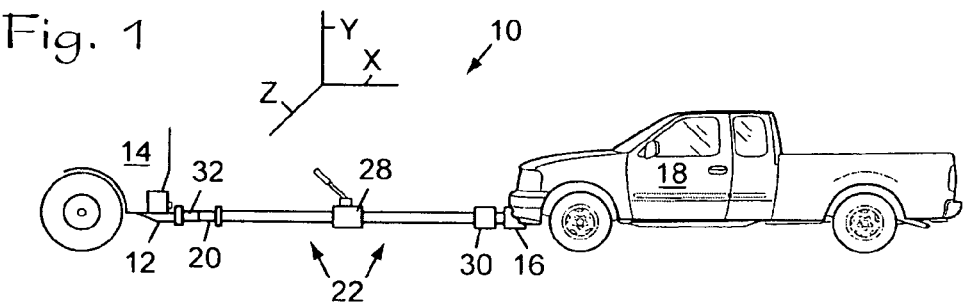
FIG. 1 is a side elevational view of a tow bar in use, according to the present invention.
Figure 2:
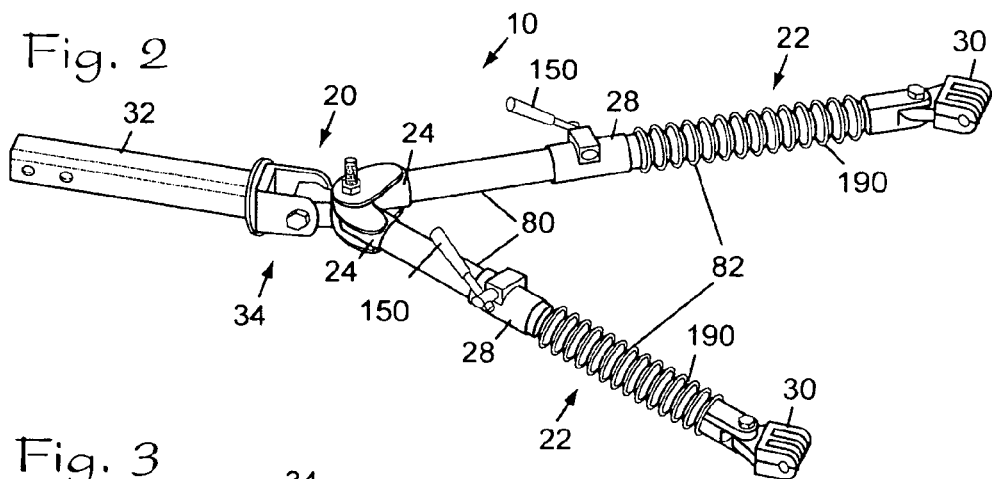
FIG. 2 is a perspective view of the tow bar.

The reference numeral 10 generally refers to a light-weight tow bar for connecting a towing vehicle to a vehicle to be towed in accordance with the present invention, as shown in FIGS. 1 through 11. The tow bar 10 includes a towing hitch member 12 of a towing vehicle 14, a towed hitch member 16 of a towed vehicle 18, a head member 20, a pair of tow bar legs 22, leg connectors 24 having distal ends 26, locking members 28, and rear connectors 30, as shown in FIGS. 1 and 2.

The head member 20 includes a forwardly-extending front connector 32 structured to releasably connect the head member 20 to the towing hitch member 12, and a rearwardly-extending articulated portion 34. Although the following disclosure may sometimes refer to the front connector 32 as being a hitch shank 32 releasably connectable to a conventional receiver hitch 12, it is to be understood that the front connector 32 may be a hitch ball-receiver used in conjunction with a hitch ball, a lunette ring used in conjunction with a pintle hitch, or other suitable hitching arrangement.

Figure 3:
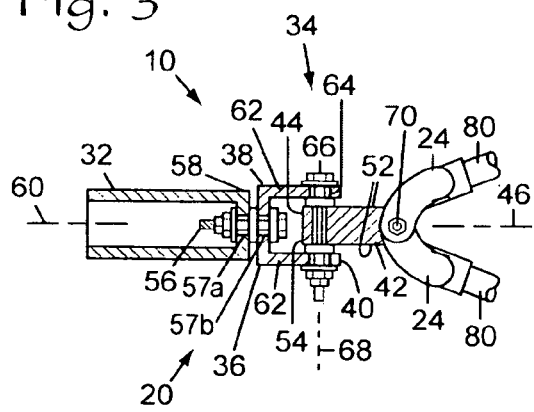
FIG. 3 is an enlarged, fragmentary and partially cross-sectional plan view of a head member of the tow bar.
Figure 4:
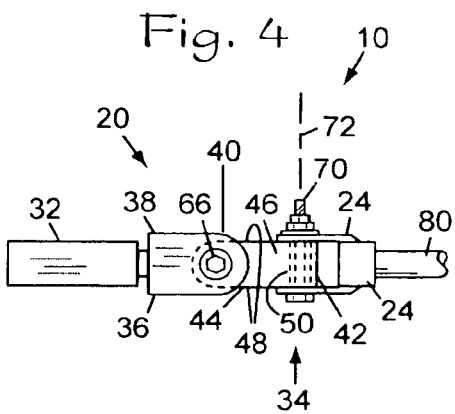
FIG. 4 is a view similar to FIG. 3 but showing a side elevational view of the head member of the tow bar.

The articulated portion 34 includes a yoke element 36 with a fore end 38 and an aft end 40, and a pivot element 42 with a fore end 44 and an aft end 46. The pivot element 42 includes generally horizontally-oriented parallel upper and lower surfaces 48 with a vertically-oriented orifice 50 therethrough, and generally vertically-oriented parallel right and left surfaces 52 with a horizontally-oriented second orifice 54 therethrough, as shown in FIGS. 3 and 4.

The fore end 38 of the yoke element 36 is connected by a first pin 56, such as a bolt, nut and washers for example, through a first orifice 57a of a distal end 58 of the shank 32 and a first orifice 57b of the fore end 38 of the yoke element 36 to pivot about first axis 60. The aft end 40 of the yoke element 36 includes parallel vertically-oriented and rearwardly-extending arms 62 having second aligned orifices 64 therethrough.

The fore end 44 of the pivot element 42 is connected to the aft end 40 of the yoke element 36 by a second pin 66, such as a bolt, nut and washers for example through second orifices 54, 64, wherein the pivot element 42 pivots relative to the yoke element 36 about horizontally-oriented second axis 68. Similarly, leg connectors 24 are connected to aft end 46 of the pivot element 42 by a third pin 70, wherein the leg connectors 24 pivot relative to the pivot element 42 about vertically-oriented third axis 72.

Each of the tow bar legs 22 includes an outer member 80 and an inner member 82. The following is sometimes described in terms of one of the tow bar legs 22. It is to be understood, however, that the description applies equally to each of the tow bar legs 22. Each outer member 80 includes a proximal end 84, a rearwardly-extending distal end 86, an outer surface 88 with a first diameter 90, and an inner surface 92 with a second diameter 94.

The outer members 80 and inner members 82 are constructed of a high-strength, light-weight composite material, such as woven fiber fabric embedded in an epoxy resin as provided by Allred & Associates of Elbridge, N.Y. under Dragon Plate™ for example, or other suitable high-strength, light-weight and/or other composite material. For example, the material used for the fibers of a woven fabric may include one or more of kevlar, S-glass (alumino-silicate glass without CaO but with high MgO content with high tensile strength) or E-glass (alumino-borosilicate glass) as provided by U.S. Composites of West Palm Beach, Fla., or any other suitable fiber material.

Other than the outer members 80 and the inner members 82, most of the other components described herein are constructed of another light-weight material such as aluminum 7075T6, or another suitable light-weight aluminum or other material, to thereby minimize the overall weight of the tow bar 10 while retaining necessary strength requirements without compromising desired ruggedness of the tow bar.

Figure 5:
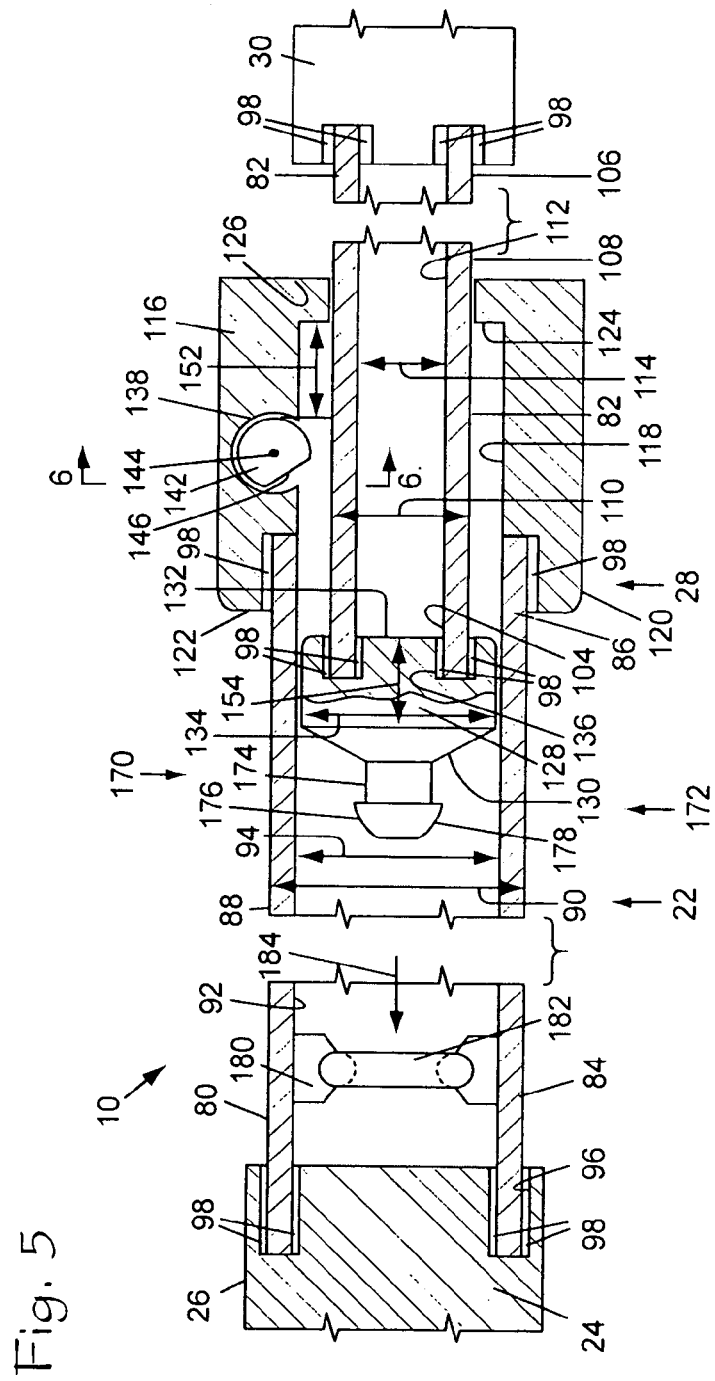
FIG. 5 is a further enlarged, fragmentary and partially cross-sectional side elevational view showing a locking member of a tow bar leg of the tow bar in an unlocked configuration.

The distal end 26 of each leg connector 24 has a groove 96 dimensioned to receive the proximal end 84 of a respective one of the outer members 80, as indicated in FIG. 5. The outer surface 88 and/or the inner surface 92 of the outer member 80 is fixedly secured to sides of the groove 96 by securing means 98, such as epoxy 98 or other suitable adhesive. It should be noted that penetrations of the outer and inner members 80, 82 must be avoided, particularly in the adverse environment to which tow bars are exposed. Otherwise, any such penetrations would seriously degrade the structural integrity of the members constructed of composite materials; thus, the epoxy 98 or other suitable adhesive is utilized to secure various other components of the tow bar to the outer and inner members 80, 82.

Each inner member 82 includes a proximal end 104, a rearwardly-extending distal end 106, an outer surface 108 having a third diameter 110, and an inner surface 112 having a fourth diameter 114. The proximal end 104 of each inner member 82 is telescopingly displaceable in the distal end 86 of the respective outer member 80.

Each of the locking members 28 includes a body element 116 having a through cavity 118 with a diameter substantially equal to the second diameter 94, a fore end 120 with a forwardly-extending lip 122 having a diameter slightly greater than the first diameter 90 and fixedly secured by the securing means 98 to the outer surface 88 of the outer member 80 at the distal end 86 thereof, and an aft end 124 having an aft orifice 126 therethrough with a diameter slightly greater than the third diameter 110 of the inner member 82 to thereby allow the inner member 82 to be slidably displaceable therethrough, as indicated in FIG. 5.

Each locking member 28 also includes a stop element 128 having a fore end 130, an aft end 132 fixedly secured by the securing means 98 to the proximal end 104 of the inner member 82, and a diameter 134 greater than the third diameter 110 but slightly less than the second diameter 94. The aft end of the stop element 128 includes a groove 136 formed therein to receive the proximal end 104 of the inner member 82, the outer surface 108 and/or the inner surface 112 of the inner member 82 being secured to the stop element 128 by the securing means 98, as indicated in FIG. 5.

The body element 116 includes an opening 138. A cam element 142, mounted to the body element 116 to pivot about a transversely-oriented axis 144, is positioned in the opening 138 and includes a contoured surface 146 with a radius of curvature substantially equal to the radius of the second diameter 94.

The locking member 28 further includes a resilient element 148, such as a spring 148 for example, configured to bias the cam element 142 wherein the cam element 142 normally protrudes into a path of the stop element 128 with the contoured surface 146 directed toward the distal end 86 of the outer member 80 as shown in FIGS. 5, 7 and 9, and a handle 150 structured to enable a user to manually pivot the cam element 142 wherein the contoured surface 146 does not protrude into the path of the stop element 128, as indicated in FIG. 8.

The spacing 152 between cam element 142 and the aft end 124 of the body element 116 is substantially equal to the spacing 154 between the fore and aft ends 130, 132 of the stop element 128.

Alternatively, instead of the body element 116 having the aft orifice 126 as hereinbefore described, the aft end 124 may include an insert 160 having a fore end 162 and an orifice 164 with a diameter slightly greater than the third diameter 110 to allow the inner member 82 to be slidably displaceable therethrough, as indicated in FIG. 10. The insert 160 is secured to the aft end 124 of the body element 116 wherein the spacing 152 between the cam element 142 and the fore end 162 of the insert 160 is substantially equal to the spacing 154 between the fore and aft ends 120, 124 of the stop member 128.

For some applications, each tow bar leg 22 may include a storage latch 170 including a cylindrically-shaped plunger 172 extending forwardly from the stop element 128. The plunger 172 includes a shaft 174, a tapered end 176, and a peripheral ridge 178 about the tapered end 176 of the plunger 172, as shown in FIG. 5.

Each storage latch 170 also includes a retainer 180 secured to the outer member 80 of the tow bar leg 22 near proximal end 84 thereof. For example, the retainer 180 may include a resilient O-ring 182. The O-ring 182 extends into the path of the ridge 178.

As the inner member 82 of a tow bar leg 22 is being longitudinally displaced inwardly relative to its respective outer member 80, as indicated by the arrow designated by numeral 184, the plunger 172 is forced against the O-ring 182, which responsively flexes to allow the plunger 172 to pass therethrough whereupon the O-ring 182 immediately and resiliently grasps the shaft 174 of the plunger 172, thereby causing the O-ring 182 to be trapped between ridge 178 and the stop element 128 to retain the inner member 82 in a stored configuration 186, as shown in FIG. 11.

Subsequently, a user can release each tow bar leg 22 from its stored configuration 186 by pulling longitudinally outwardly on distal end 106 thereof causing ridge 178 to pass back through O-ring 182.

Preferably, each inner member 82 is enclosed in a protective boot 188 as indicated in FIG. 2 to, among other things, prevent accumulation of debris, etc., on an exposed portion 190 of the outer surface 108 which may otherwise inhibit displacement of the inner member 82 relative to its respective outer member 80. For example, boots 190 may have an accordion-like structure constructed of a flexible material, such as rubber or other suitable material.

In an application of the present invention, each handle 150 is manually manipulated to overcome the bias of the resilient element 148 until the contoured surface 146 of the cam element 144 is directed inwardly thereby allowing the stop element 128 and the proximal end 104 of each inner member 82 to be displaced farther into the respective outer member 80. The towing vehicle is then positioned in front of the vehicle to be towed. With the front connector 32 secured to the towing hitch member 12 of the towing vehicle, each tow bar leg 22 is then independently manipulated to connect the rear connector 30 secured to the distal end 106 of its inner member 82 to the towed hitch member 16.

Then, as the towing vehicle is slowly driven forward, the distal end 106 of each inner member 82 is pulled outwardly from its respective outer member 80 as indicated by the arrow designated by numeral 192. As the aft end 132 of each stop element 128 abuttingly engages and bears against the contoured surface 146, the cam element 124 is caused to pivot about its axis 144, as indicated by the arrow designated by numeral 194 in FIG. 8, wherein the stop element 128 can then pass beneath the cam element 142. Then, as the aft end 132 of the stop element 128 abuttingly engages the aft end 124 of the body element 116 (or the fore end 162 of the insert 160), the fore end 130 of the stop element 128 simultaneously clears the contoured surface 146 of the cam element 142 whereupon the resilient element 148 automatically biases the cam element 142 about axis 144, as indicated by the arrow designated by numeral 196 in FIG. 9, causing the cam element 142 to protrude into the path of the stop element 128, thereby capturing the stop element 128.

The cam element 142 protruding into the path, and abutting the fore end 130, of the stop element 128 operationally prevents the inner member 82 from being displaced forwardly relative to its outer member 80, and the aft end 124 of the body element 116 abutting the aft end 132 of the stop element 126 (or the fore end 162 of the insert 160) prevents the inner member 82 from being displaced rearwardly relative to its outer member 80, thereby locking the inner member 82 relative to its outer member 80. When both tow bar legs 22 have been so locked, each tow bar leg 22 is then locked at a desired length for towing the towed vehicle behind the towing vehicle.

When the tow bar has been disconnected from the towing and towed vehicles, it may be desirable to release the tow bar legs 22 by appropriately manipulating the handles 150 so the inner members 82 can be slidingly displaced sufficiently farther into their respective outer members 80 until the shafts 172 have been received through the respective O-rings 182 for storage purposes.

It is to be understood that while certain forms of the present invention have been illustrated and described herein, it is not to be limited to the specific forms or connection of parts as described and shown.

I claim:

1. A tow bar for connecting a towing vehicle to a vehicle to be towed, the tow bar comprising:
    (a) a towing hitch member connected to a towing vehicle;
    (b) a towed hitch member connected to a vehicle to be towed;
    (c) a head member having a front connector structured to connect the head member to the towing hitch member, and an articulated portion;
    (d) at least one leg connector having a proximal end pivotally connected to the articulated portion of the head member, and a distal end;
    (e) securing means;
    (f) at least one tow bar leg including:
        (1) an outer member constructed of composite material and having a proximal end secured by the securing means to the at least one leg connector, a distal end, an outer surface with a first diameter, and an inner surface with a second diameter, and
        (2) an inner member constructed of composite material and having a proximal end, a distal end, an outer surface with a third diameter and an inner surface with a fourth diameter; and
    (g) at least one locking member including:
        (1) a body element having a fore end secured by the securing means to the distal end of the outer member and including:
            (A) a through cavity with a diameter substantially equal to the second diameter, and
            (B) an aft end having an aft orifice with a diameter slightly greater than the third diameter to thereby allow the inner member to be slidably displaceable therethrough,
        (2) a stop element having a diameter greater than the third diameter but slightly less than the second diameter, a fore end, and an aft end fixedly secured by the securing means to the proximal end of the inner member,
        (3) a cam opening,
        (4) a cam element mounted to the body element to pivot about a transversely-oriented axis, the cam element being positioned in the cam opening and having a contoured surface with a radius of curvature substantially equal to the radius of the second diameter,
        (5) a resilient element configured to bias the cam element wherein the cam element normally protrudes into a path of the stop element with the contoured surface being directed toward the distal end of the outer member, and
        (6) a handle structured to enable a user to manually pivot the cam element wherein the contoured surface does not protrude into the path of the stop element,
        (7) the cam element being spaced from the distal end of the body element wherein, as the inner member is being displaced rearwardly relative to the outer member and the aft end of the stop element abuttingly engages the aft end of the body element, the fore end of the stop element simultaneously clears the cam element whereupon the resilient element automatically pivots the cam element wherein the cam element protrudes into the path of the stop element capturing the stop element between the cam element and the aft end of the body element thereby locking the inner member relative to the outer member; and
    (h) at least one rear connector fixedly secured by the securing means to the distal end of the inner member, the at least one rear connector being structured to releasably connect the at least one tow bar leg to the towed hitch member.

2. A tow bar as described in claim 1, further comprising:
    (a) a groove formed in the distal end of the at least one leg connector, the groove dimensioned to receive the proximal end of the outer member therein; and (b) the at least one leg connector being secured by the securing means to the outer surface and/or the inner surface of the outer member.

3. A tow bar as described in claim 1, further comprising the fore end of the body element including a forwardly-extending lip with a diameter slightly greater than the first diameter, the lip being secured by the securing means to the outer surface of the outer member at the distal end thereof.

4. A tow bar as described in claim 1, further comprising:
(a) a groove formed in the aft end of the stop element, the groove dimensioned to receive the proximal end of the inner member therein; and
(b) the stop element being secured by the securing means to the outer surface and/or the inner surface of the inner member.

5. A tow bar as described in claim 1, further comprising:
(a) a groove formed in the fore end of the at least one rear connector, the groove dimensioned to receive the distal end of the inner member therein; and
(b) the at least one rear connector being secured by the securing means to the outer surface and/or the inner surface of the inner member.

6. A tow bar as described in claim 1, further comprising the aft end of the body element including an insert secured therein, the insert having the aft orifice therethough to thereby allow the inner member to be slidably displaceable therethrough.

7. A tow bar as described in claim 1, wherein the resilient element includes a spring.

8. A tow bar as described in claim 1, wherein the outer and inner members are constructed of a woven fiber fabric embedded in an epoxy resin.

9. A tow bar as described in claim 8, wherein the materials of the fibers of the woven fiber fabric are selected from at least one of a group consisting of kevlar, S-glass, E-glass, and carbon fiber.

10. A tow bar as described in claim 1, having a storage latch including a plunger secured to the fore end of the stop element and a retainer secured to the outer member near the proximal end thereof, the storage latch being structured to releasable secure the at least one tow bar leg in a stored configuration.

11. A tow bar as described in claim 1, wherein the articulated portion includes:
(a) a yoke element having a fore end with a first orifice, an aft end including parallel vertically-oriented and rearwardly-extending arms having aligned second orifices therethrough,
(b) a first pin pivotally connecting the fore end of the yoke element to the front connector to pivot about a fore-to-aft first axis,
(c) a pivot element having a fore end with generally horizontally-oriented parallel right and left surfaces with a vertically-oriented second orifice therethrough, generally vertically-oriented parallel upper and lower surfaces with a horizontally-oriented third orifice therethrough,
(d) a second pin through the second orifices of the yoke element connecting the pivot element to pivot about a second axis relative to the yoke element,
(e) a third pin through the leg connector orifices and the third orifice of the pivot element connecting the leg connectors to pivot about a third axis relative to the yoke element.

12. A tow bar as described in claim 1 further comprising at least one boot enclosing an exposed portion of the at least one inner member of the at least one tow bar leg.

13. A tow bar as described in claim 12, wherein the at least one boot is constructed of flexible material.

14. A tow bar for connecting a towing vehicle to a vehicle to be towed, the tow bar comprising:
(a) a towing hitch member connected to a towing vehicle;
(b) a towed hitch member connected to a vehicle to be towed;
(c) a head member having a front connector structured to connect the head member to the towing hitch member, and an articulated portion including:
(1) a yoke element having a fore end with a first orifice, an aft end including parallel vertically-oriented and rearwardly-extending arms having aligned second orifices therethrough,
(2) a first pin pivotally connecting the fore end of the yoke element to the front connector to pivot about a fore-to-aft first axis,
(3) a pivot element having a fore end with generally horizontally-oriented parallel right and left surfaces with a vertically-oriented second orifice therethrough, generally vertically-oriented parallel upper and lower surfaces with a horizontally-oriented third orifice therethrough,
(4) a second pin through the second orifices of the yoke element connecting the pivot element to pivot about a second axis relative to the yoke element,
(5) a third pin through the leg connector orifices and the third orifice of the pivot element connecting the leg connectors to pivot about a third axis relative to the yoke element;
(d) a pair of leg connectors each having a proximal end pivotally connected to the articulated portion of the head member and a distal end, wherein each distal end includes a groove formed therein wherein the groove is dimensioned to receive the proximal end of a respective outer member therein;
(e) securing means;
(f) a pair of tow bar legs, each tow bar leg including:
(1) an outer member constructed of composite material and having a proximal end secured by the securing means to the at least one leg connector, a distal end, an outer surface with a first diameter, and an inner surface with a second diameter, a respective leg connector being secured by the securing means to the outer surface and/or the inner surface of the outer member, and
(2) an inner member constructed of composite material and having a proximal end, a distal end, an outer surface with a third diameter and an inner surface with a fourth diameter,
(3) the outer and inner members being constructed of a woven fiber fabric embedded in an epoxy resin wherein the materials of the fibers of the woven fiber fabric are selected from at least one of a group consisting of kevlar, S-glass and E-glass; and
(g) a locking member including:
(1) a body element having a fore end secured by the securing means to the distal end of the outer member and including:
(A) a through cavity with a diameter substantially equal to the second diameter,
(B) a fore end including a forwardly-extending lip with a diameter slightly greater than the first diameter, the lip being secured by the securing means to the outer surface of the outer member at the distal end thereof, and (C) an aft end including an insert secured therein, the insert having an aft orifice therethrough with a diameter slightly greater than the third diameter to thereby allow the inner member to be slidably displaceable therethrough (2) a stop element having a diameter greater than the third diameter but slightly less than the second diameter, a fore end, and an aft end including a groove dimensioned to receive the proximal end of the inner member therein wherein the stop element is secured by the securing means to the outer surface and/or the inner surface of the inner member, (3) a cam opening, (4) a cam element mounted to the body element to pivot about a transversely-oriented axis, the cam element being positioned in the cam opening and having a contoured surface with a radius of curvature substantially equal to the radius of the second diameter, (5) a spring configured to bias the cam element wherein the cam element normally protrudes into a path of the stop element with the contoured surface being directed toward the distal end of the outer member, and (6) a handle structured to enable a user to manually pivot the cam element wherein the contoured surface does not protrude into the path of the stop element, (7) the cam element being spaced from the distal end of the body element wherein, as the inner member is being displaced rearwardly relative to the outer member and the aft end of the stop element abuttingly engages the aft end of the body element, the fore end of the stop element simultaneously clears the cam element whereupon the resilient element automatically pivots the cam element wherein the cam element protrudes into the path of the stop element capturing the stop element between the cam element and the aft end of the body element thereby locking the inner member relative to the outer member;

(h) a pair of rear connectors each having groove formed in a fore end thereof, the groove being dimensioned to receive the distal end of a respective inner member therein and secured to the outer surface and/or the inner surface of the inner member by the securing means, and an aft end structured to releasably connect the rear connectors to the towed hitch member;

(i) storage latches each including a plunger secured to the fore end of a respective stop element and a retainer secured to a respective outer member near the proximal end thereof, the storage latches being structured to releasably secure the tow bar legs in a stored configuration; and (j) boots constructed of flexible material and structured to enclose exposed portions of the inner members of the tow bar legs.

15. A lock for a tow bar leg with an outer member having a distal end, an outer surface with a first diameter and an inner surface with a second diameter, and an inner member having a proximal end, an outer surface with a third diameter and an inner surface with a fourth diameter wherein said proximal end of said inner member is telescopingly displaceable in said distal end of said outer member, the lock comprising:

(a) securing means;

(b) at least one locking member including:

(1) a body element having a fore end secured by the securing means to an outer member of a tow bar leg and including:

(A) a through cavity with a diameter substantially equal to a second diameter of said outer member, and (B) an aft end having an orifice with a diameter slightly greater than a third diameter of an inner member of said tow bar leg to thereby allow said inner member to be slidably displaceable therethrough, (2) a stop element having a diameter greater than said third diameter of said inner member third diameter but slightly less than the second diameter, a fore end, and an aft end fixedly secured by the securing means to the inner member, (3) a cam opening, (4) a cam element mounted to the body element to pivot about an axis transversely-oriented relative to the tow bar leg, the cam element being positioned in the cam opening and having a contoured surface with a radius of curvature substantially equal to a radius of the second diameter, (5) a resilient element configured to bias the cam element wherein the cam element normally protrudes into a path of the stop element with the contoured surface being directed toward the outer member, and (6) a handle structured to enable a user to manually pivot the cam element wherein the cam element does not protrude into the path of the stop element, (7) the cam element being spaced from the distal end of the body element wherein, as the inner member is being displaced relative to the outer member and the aft end of the stop element abuttingly engages the aft end of the body element, the fore end of the stop element simultaneously clears the cam element whereupon the resilient element automatically pivots the cam element wherein the cam element protrudes into the path of the stop element capturing the stop element between the cam element and the aft end of the body element thereby locking the inner member relative to the outer member.

16. A tow bar as described in claim 15, further comprising the fore end of the body element including a forwardly-extending lip with a diameter slightly greater than the first diameter, the lip being secured by the securing means to the outer surface of the outer member at the distal end thereof.

17. A tow bar as described in claim 15, further comprising:

(a) a groove formed in the aft end of the stop element, the groove dimensioned to receive the proximal end of the inner member therein; and (b) the stop element being secured by the securing means to the outer surface and/or the inner surface of the inner member.

18. A tow bar as described in claim 15, further comprising the aft end of the body element including an insert secured therein, the insert having the aft orifice therethough to thereby allow the inner member to be slidably displaceable therethrough.

19. A tow bar as described in claim 15, wherein the resilient element includes a spring.

20. A lock for a tow bar leg with an outer member having a distal end, an outer surface with a first diameter and an inner surface with a second diameter, and an inner member having a proximal end, an outer surface with a third diameter and an inner surface with a fourth diameter wherein said proximal end of said inner member is telescopingly displaceable in said distal end of said outer member, the lock comprising:

(a) securing means;
(b) a locking member including:
  (1) a body element having a fore end secured by the securing means to a distal end of the outer member and including:
    (A) a through cavity with a diameter substantially equal to a second diameter of the outer member,
    (B) a fore end including a forwardly-extending lip with a diameter slightly greater than a first diameter of the outer member, the lip being secured by the securing means to the outer surface of the outer member at the distal end thereof, and
    (C) an aft end including an insert secured therein, the insert having an aft orifice therethrough with a diameter slightly greater than a third diameter of the inner member,
  (2) a stop element having a diameter greater than the third diameter but slightly less than the second diameter, a fore end, and an aft end including a groove dimensioned to receive a proximal end of the inner member therein wherein the stop element is secured by the securing means to the outer surface and/or the inner surface of said inner member,
  (3) a cam opening,
  (4) a cam element mounted to the body element to pivot about an axis transversely-oriented relative to said tow bar leg, the cam element being positioned in the cam opening and having a contoured surface with a radius of curvature substantially equal to the radius of said second diameter,
  (5) a spring configured to bias the cam element wherein the cam element normally protrudes into a path of the stop element with the contoured surface being directed toward said outer member, and
  (6) a handle structured to enable a user to manually pivot the cam element wherein the cam element does not protrude into the path of the stop element,
  (7) the cam element being spaced from the distal end of the insert wherein, as said inner member is being displaced relative to said outer member and the aft end of the stop element abuttingly engages the aft end of the insert, the fore end of the stop element simultaneously clears the cam element whereupon the resilient element automatically pivots the cam element wherein the cam element protrudes into the path of the stop element capturing the stop element between the cam element and the insert thereby locking said inner member relative to said outer member.

* * * * *